United States Patent
Bodog et al.

(10) Patent No.: US 9,100,846 B2
(45) Date of Patent: Aug. 4, 2015

(54) TERMINAL MEASUREMENT CONFIGURATION IN CARRIER AGGREGATION

(75) Inventors: Gyula Bodog, Budapest (HU); Malgorzata Tomala, Nowe Miasto nad Pilica (PL); Yi Zhang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 34 days.

(21) Appl. No.: 13/978,903

(22) PCT Filed: Jan. 10, 2011

(86) PCT No.: PCT/EP2011/000056
§ 371 (c)(1),
(2), (4) Date: Jul. 10, 2013

(87) PCT Pub. No.: WO2012/095113
PCT Pub. Date: Jul. 19, 2012

(65) Prior Publication Data
US 2013/0288664 A1 Oct. 31, 2013

(51) Int. Cl.
H04W 24/00 (2009.01)
H04W 24/10 (2009.01)
H04W 24/02 (2009.01)
H04W 24/08 (2009.01)

(52) U.S. Cl.
CPC .......... *H04W 24/00* (2013.01); *H04W 24/10* (2013.01); *H04W 24/02* (2013.01); *H04W 24/08* (2013.01)

(58) Field of Classification Search
USPC .................. 455/422.1, 423, 437, 452.1, 561; 370/252, 331
See application file for complete search history.

(56) References Cited

U.S. PATENT DOCUMENTS

2009/0270103 A1  10/2009  Pani et al. .......... 455/436
2012/0147772 A1*  6/2012  Kazmi et al. .......... 370/252

FOREIGN PATENT DOCUMENTS

WO  WO 2010/140797 A2  12/2010

OTHER PUBLICATIONS

3GPP TR 36.805 V9.0.0 (Dec. 2009), "3rd Generation Partnership Project; Technical specification Group Radio Access Network; Study on Minimization of drive-tests in Next Generation Networks; (Release 9)", 24 pgs.
3GPP TSG-RAN2 Meeting #67, Shenzhen, China, Aug. 24-28, 2009, R2-094966, "Measurement configuration structure for carrier aggregation", LG Electronics Inc., 4 pgs.
(Continued)

*Primary Examiner* — Sam Bhattacharya
(74) *Attorney, Agent, or Firm* — Harrington & Smith

(57) ABSTRACT

There are provided measures for terminal measurement configuration in carrier aggregation, said measures exemplarily including a configuration of one or more carriers for automatic terminal measurements relating to network performance on said one or more carriers, said one or more carriers being carriers in a carrier aggregation for one or more terminals, wherein said configuration may be dependent on the one or more terminals' capabilities in terms of single- or multi-carrier terminal measurements. According to such configuration, automatic terminal measurements may be performed simultaneously on the configured one or more carriers or on the configured one or more carriers based on a predetermined priority of each carrier. Said measures may exemplarily be applied for in an MDT context.

23 Claims, 5 Drawing Sheets

(56) References Cited

OTHER PUBLICATIONS

3GPP TSG-RAN WG2 #68, Nov. 9-13, 2009, Jeju, Korea, R2-096600, "Consideration on CP Solution of Minimization of Drive Test", Huawei, 4 pgs.

3GPP TSG-RAN WG2 Meeting #68, Jeju, Korea, Nov. 9-13, 2009, R2-097020, "Architectures comparison", Nokia Siemens Networks, et al., 7 pgs.

3GPP TSG-RAN 2#71bis, Oct. 11-15, 2011, Xi'an, China, R2-105737, "Further clacification on the necessity of log type 3 of the summary of email discussion 71#51", NTT DOCOMO. Inc., 5 pgs.

3GPP TSG-SA5 (Telecon Management) Meeting SA5#71, May 10-14, 2010, Montreal, Canada, S5-101255, "UE selection related to Minimisation of Drive Test", Nokia Siemens Networks, 4 pgs.

3GPP TS 36.133 V10.0.0; $3^{rd}$ Generation Partnership Project; Technical Specification Group Radio Access Network; Evolved Universal Terrestrial Radio Access (E-UTRA); Requirements for support of radio resource management (Release 10); Oct. 2010; whole document (389 pages).

3GPP TS 37.320 V10.0.0; $3^{rd}$ Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10); Dec. 2010; Paragraphs 5.1.1.1 & 5.1.1.3.3, Figure 5.1.1.1_1 (17 pages).

* cited by examiner

TERMINAL MEASUREMENT CONFIGURATION IN CARRIER AGGREGATION

FIELD OF THE INVENTION

The present invention relates to terminal measurement configuration in carrier aggregation, in particular to carrier configuration for automatic terminal measurements in carrier aggregation.

BACKGROUND OF THE INVENTION

In the deployment, operation and administration of communication networks, knowledge of network performance at specific locations and for specific communication resources (such as frequencies, carriers, etc.) is vital.

For obtaining such required knowledge of network performance, drive tests are typically to be performed by the network operator. Yet, performing such manual drive tests is expensive and cumbersome. Accordingly, efforts for minimizing drive tests (MDT) are made in current standardization work, e.g. by 3GPP (Third Generation Partnership Project). In the MDT context, automatic data collection of UE (user equipment) measurements (and automatic UE measurements) are defined to enable easier monitoring of network performance and, consequently, to replace or at least reduce the need for expensive manual drive tests.

Currently, two MDT approaches (for MDT measurement, logging and reporting) are agreed and accepted in 3GPP. The one approach is referred to as Immediate MDT reporting and the other approach is referred to as Logged MDT reporting. In Immediate MDT reporting, MDT configuration as well as MDT data collection are done when the relevant UE is in connected mode. In Logged MDT reporting, MDT configuration is done when the relevant UE is in connected mode, and MDT data collection is done when the relevant UE is in idle mode.

The measurement, and reporting functions follows general rules according to current specifications, such as defined e.g. in 3GPP TS 36.133. According to such general rules, besides certain freedom in specific cases, the UE is at least in certain cases mandated to perform serving cell measurements only.

Therefore, following the current general rules, is problematic in scenarios in which terminal such as a UE may be served by more than one cell, i.e. the terminal has allocated more than a single communication resource for being served by the network. This may specifically the case in carrier aggregation (CA).

In carrier aggregation (CA), two or more carriers, typically referred to as component carriers (CCs), are aggregated for a terminal in order to support wider transmission bandwidths (e.g. up to 100 MHz). In such CA scenario, a terminal may have a primary carrier representing the serving cell as well as a set of cells represented by a primary cell and one or more aggregated secondary carriers (e.g. for supporting wider transmission bandwidth) representing alternative cells for being chosen as a new serving cell.

Following the current general rules for MDT reporting, in a CA scenario, the UE only measures the primary carrier being regarded as the serving cell (in particular, when it is in idle mode). Only under specific cases, the UE may measure a secondary carrier (instead of the primary carrier). Namely, the UE only measures all indicated inter-frequency/RAT (radio access technology) and intrafrequency neighbors in case the serving cell signal becomes weak in order to choose a new serving cell. Accordingly, the UE typically only measures the carrier currently/prospectively representing the serving cell, which only depends on signal strength characteristics being subject to dynamic and uncontrollable changes. Stated in other words, in CA scenarios, (logged/immediate) MDT reporting mainly depends on which carrier the (idle/connected) UE currently camps on, instead of a network-controllable configuration. Furthermore, in CA scenarios, different UEs have different primary carriers, thus different UEs camping on different carriers (e.g. after going to idle mode), which may lead to unequal measurement quantities on different carriers, instead of a network-controllable configuration.

Moreover, in CA scenarios, it is likely that resources may expand across multiple carriers. Since different carriers may have different coverage, it would be beneficial to collect information about radio conditions and discover differences between the individual carriers. Also for carriers having the same coverage, it would be beneficial to be able to compare measurement results and figure out optimum configuration settings. However, with the current general rules for MDT reporting, only the measurement, and reporting of the serving cell may be ensured.

From the MDT point of view, it would be better to know the performance of all of the CA carriers (i.e. the primary carrier and the secondary carrier/s) at the same location and time when CA is deployed. In view thereof, automatic data collection of UE measurements (and automatic UE measurements) are required, the configuration of which is controllable from the network side.

In view of the above, there is a need for mechanisms enabling a network-controlled configuration of terminal measurements in carrier aggregation. Specifically, there is a need for mechanisms enabling the determination of one or more specific carriers (primary and/or secondary carriers) for which MDT reporting is desired and/or enabling equal measurement results/quantities for different carriers (primary and/or secondary carriers) in MDT reporting.

Accordingly, there is a demand for mechanisms for terminal measurement configuration in carrier aggregation.

SUMMARY OF EMBODIMENTS OF THE INVENTION

The present invention and its embodiments aim at solving or at least mitigating the above problems.

The present invention and its embodiments are made to provide for mechanisms for terminal measurement configuration in carrier aggregation.

According to an exemplary first aspect of the present invention, there is provided a method comprising configuring one or more carriers for automatic terminal measurements relating to network performance on said one or more carriers, said one or more carriers being carriers in a carrier aggregation for one or more terminals, and indicating the configuration of said one or more carriers for automatic terminal measurements towards a base station of said one or more terminals.

According to further developments or modifications thereof, one or more of the following applies:
  the configuring is dependent on the one or more terminals' capabilities in terms of single- or multi-carrier terminal measurements,
  said one or more carriers being configured for automatic terminal measurements are one or more carriers in the carrier aggregation, and are configured for simultaneous automatic terminal measurements of at least some of the carriers in the carrier aggregation,
  said one or more carriers being configured for automatic terminal measurements are carriers in the carrier aggregation, and are configured for priority-based automatic terminal measurements of any one of the carriers in the carrier aggregation based on a predetermined priority of any one of said carriers, the indicating comprises instructing automatic terminal measurements with the configuration of said one or more carriers by way of a trace operation, the indicating comprises activating a trace and/or a trace job for automatic terminal measurements with the configuration of said one or more carriers, the indicating comprises transmitting a predetermined trace attribute and/or message defining the configuration of said one or more carriers for automatic terminal measurements, the automatic terminal measurements comprise automatic data collection and/or logging relating to said one or more carriers, the automatic terminal measurements relate to logged and/or immediate measurements for minimizing drive tests, and/or the method is operable at or by a network management entity and/or system or an operation and maintenance entity or system of the network, including an IRPManager and/or an IRPAgent.

According to an exemplary second aspect of the present invention, there is provided a method comprising retrieving an indication of a configuration of one or more carriers for automatic terminal measurements relating to network performance on said one or more carriers, said one or more carriers being carriers in a carrier aggregation for one or more terminals, and controlling the configuration of said one or more carriers for automatic terminal measurements towards said one or more terminals.

According to further developments or modifications thereof, one or more of the following applies:

the configuration is dependent on the one or more terminals' capabilities in terms of single- or multicarrier terminal measurements, said one or more carriers being configured for automatic terminal measurements are one or more carriers in the carrier aggregation, and are configured for simultaneous automatic terminal measurements of at least some of the carriers in the carrier aggregation, and the controlling comprises instructing the one or more terminals to simultaneously perform automatic terminal measurements on the configured one or more carriers, wherein said configured and instructed one more carriers include primary and/or secondary carriers of a respective terminal, said one or more carriers being configured for automatic terminal measurements are carriers in the carrier aggregation, and are configured for priority-based automatic terminal measurements of any one of the carriers in the carrier aggregation based on a predetermined priority of any one of said carriers, and the controlling comprises instructing the one or more terminals to perform automatic terminal measurements on the configured carriers based on the predetermined priority of each configured carrier, wherein each configured and instructed carrier includes a primary carrier of a respective terminal, the instructing comprises selecting the one or more terminals to be instructed for each configured carrier, which carrier is the primary carrier of a respective terminal, based on the priority of said carrier such that the number of selected terminals is the higher the higher the priority of the respective configured carrier is, or adjusting a period for automatic terminal measurements at the one or more terminals to be instructed for each configured carrier, which carrier is the primary carrier of a respective terminal, based on the priority of said carrier such that the length of the measurement period is the higher the higher the priority of the respective configured carrier is, the selecting comprises redirecting one or more terminals to camp on a primary carrier having a higher priority than their previous primary carrier, respectively, the retrieving comprises receiving an instruction of automatic terminal measurements with the configuration of said one or more carriers by way of a trace operation, the retrieving comprises receiving an activation of a trace and/or a trace job for automatic terminal measurements with the configuration of said one or more carriers, the retrieving comprises receiving a predetermined trace attribute and/or message defining the configuration of said one or more carriers for automatic terminal measurements, and the method further comprises mapping the received predetermined trace attribute and/or message into a predetermined radio resource control attribute and/or message, the controlling comprises transmitting a predetermined radio resource control attribute and/or message defining the configuration of said one or more carriers for automatic terminal measurements, the automatic terminal measurements comprise automatic data collection and/or logging relating to said one or more carriers, the automatic terminal measurements relate to logged and/or immediate measurements for minimizing drive tests, wherein the controlling is accomplished in a connected mode of said one or more terminals and relates to automatic terminal measurements in idle mode of said one or more terminals for logged measurements for minimizing drive tests and/or connected mode of said one or more terminals for immediate measurements for minimizing drive tests, and/or the method is operable at or by a base station of said one or more terminals, including an eNodeB, a radio network controller and an IRPAgent.

According to an exemplary third aspect of the present invention, there is provided a method comprising acquiring a control of a configuration of one or more carriers for automatic terminal measurements relating to network performance on said one or more carriers, said one or more carriers being carriers in a carrier aggregation for a terminal, and performing automatic terminal measurements on the configured one or more carriers according to the configuration of said one or more carriers.

According to further developments or modifications thereof, one or more of the following applies:

said one or more carriers being configured for automatic terminal measurements are one or more carriers in the carrier aggregation of said terminal, and are configured for simultaneous automatic terminal measurements of at least some of the carriers in the carrier aggregation of said terminal, and the performing comprises simultaneously performing automatic terminal measurements on the configured one or more carriers, wherein said configured one more carriers include primary and/or secondary carriers of said terminal, said one or more carriers being configured for automatic terminal measurements include a carrier in the carrier aggregation of said terminal, and are configured for priority-based automatic terminal measurements based on a predetermined priority of said carrier, and the performing comprises performing automatic terminal measurements on the configured carrier of said terminal based on the predetermined priority of said configured carrier, wherein said configured carrier includes a primary carrier of said terminal, the automatic terminal measurements are performed with a fixed length of a measurement period or with a length of a measurement period according to the priority of the respective configured carrier such that the length of the measurement period is the higher the higher the priority of the respective configured primary carrier is, the acquiring comprises receiving a predetermined radio resource control attribute and/or message defining the configuration of said one or more carriers for automatic terminal measurements, the automatic terminal measurements comprise automatic data collection and/or logging relating to said one or more carriers, the automatic terminal measurements relate to logged and/or immediate measurements for minimizing drive tests, wherein the acquiring is accomplished in a connected mode and the performing is accomplished in an idle mode for logged measurements for minimizing drive tests and the acquiring and the performing are accomplished in a connected mode for immediate measurements for minimizing drive tests, and/or the method is operable at or by the terminal, including a user equipment.

According to an exemplary fourth aspect of the present invention, there is provided an apparatus comprising a processor configured to configure one or more carriers for automatic terminal measurements relating to network performance on said one or more carriers, said one or more carriers being carriers in a carrier aggregation for one or more terminals, and indicate the configuration of said one or more carriers for automatic terminal measurements towards a base station of said one or more terminals.

According to further developments or modifications thereof, one or more of the following applies:

the processor is configured to execute the configuring dependent on the one or more terminals' capabilities in terms of single- or multi-carrier terminal measurements, the processor is configured to execute the configuring such that said one or more carriers being configured for automatic terminal measurements are one or more carriers in the carrier aggregation, and are configured for simultaneous automatic terminal measurements of at least some of the carriers in the carrier aggregation, the processor is configured to execute the configuring such that said one or more carriers being configured for automatic terminal measurements are carriers in the carrier aggregation, and are configured for priority-based automatic terminal measurements of any one of the carriers in the carrier aggregation based on a predetermined priority of any one of said carriers, the processor, for indicating, is configured to instruct automatic terminal measurements with the configuration of said one or more carriers by way of a trace operation, the processor, for indicating, is configured to activate a trace and/or a trace job for automatic terminal measurements with the configuration of said one or more carriers, the processor, for indicating, is configured to and/or the apparatus further comprises a transmitter configured to transmit a predetermined trace attribute and/or message defining the configuration of said one or more carriers for automatic terminal measurements, the automatic terminal measurements comprise automatic data collection and/or logging relating to said one or more carriers, the automatic terminal measurements relate to logged and/or immediate measurements for minimizing drive tests, and/or the apparatus is operable as or at a network management entity and/or system or an operation and maintenance entity or system of the network, including an IRPManager and/or an IRPAgent.

According to an exemplary fifth aspect of the present invention, there is provided an apparatus comprising a processor configured to retrieve an indication of a configuration of one or more carriers for automatic terminal measurements relating to network performance on said one or more carriers, said one or more carriers being carriers in a carrier aggregation for one or more terminals, and control the configuration of said one or more carriers for automatic terminal measurements towards said one or more terminals.

According to further developments or modifications thereof, one or more of the following applies:

the configuration is dependent on the one or more terminals' capabilities in terms of single- or multi-carrier terminal measurements, said one or more carriers being configured for automatic terminal measurements are one or more carriers in the carrier aggregation, and are configured for simultaneous automatic terminal measurements of at least some of the carriers in the carrier aggregation, and the processor, for controlling, is configured to instruct the one or more terminals to simultaneously perform automatic terminal measurements on the configured one or more carriers, wherein said configured and instructed one more carriers include primary and/or secondary carriers of a respective terminal, said one or more carriers being configured for automatic terminal measurements are carriers in the carrier aggregation, and are configured for priority-based automatic terminal measurements of any one of the carriers in the carrier aggregation based on a predetermined priority of any one of said carriers, and the processor, for controlling, is configured to instruct the one or more terminals to perform automatic terminal measurements on the configured carriers based on the predetermined priority of each configured carrier, wherein each configured and instructed carrier includes a primary carrier of a respective terminal, the processor, for instructing, is configured to select the one or more terminals to be instructed for each configured carrier, which carrier is the primary carrier of a respective terminal, based on the priority of said carrier such that the number of selected terminals is the higher the higher the priority of the respective configured carrier is, or adjust a period for automatic terminal measurements at the one or more terminals to be instructed for each configured carrier, which carrier is the primary carrier of a respective terminal, based on the priority of said carrier such that the length of the measurement period is the higher the higher the priority of the respective configured carrier is, the processor, for selecting, is configured to redirect one or more terminals to camp on a primary carrier having a higher priority than their previous primary carrier, respectively, the processor, for retrieving, is configured to and/or the apparatus further comprises a receiver configured to receive an instruction of automatic terminal measurements with the configuration of said one or more carriers by way of a trace operation, the processor, for retrieving, is configured to and/or the apparatus further comprises a receiver configured to receive an activation of a trace and/or a trace job for automatic terminal measurements with the configuration of said one or more carriers, the processor, for retrieving, is configured to and/or the apparatus further comprises a receiver configured to receive a predetermined trace attribute and/or message defining the configuration of said one or more carriers for automatic terminal measurements, and the processor is further configured to map the received predetermined trace attribute and/or message into a predetermined radio resource control attribute and/or message, the processor, for controlling, is configured to and/or the apparatus further comprises a transmitter configured to transmit a predetermined radio resource control attribute and/or message defining the configuration of said one or more carriers for automatic terminal measurements.

the automatic terminal measurements comprise automatic data collection and/or logging relating to said one or more carriers, the automatic terminal measurements relate to logged and/or immediate measurements for minimizing drive tests, wherein the controlling is accomplished in a connected mode of said one or more terminals and relates to automatic terminal measurements in idle mode of said one or more terminals for logged measurements for minimizing drive tests and/or connected mode of said one or more terminals for immediate measurements for minimizing drive tests, and/or the apparatus is operable as or at a base station of said one or more terminals, including an eNodeB, a radio network controller and an IRPAgent.

According to an exemplary sixth aspect of the present invention, there is provided an apparatus comprising a processor configured to acquire a control of a configuration of one or more carriers for automatic terminal measurements relating to network performance on said one or more carriers, said one or more carriers being carriers in a carrier aggregation for a terminal, and perform automatic terminal measurements on the configured one or more carriers according to the configuration of said one or more carriers.

According to further developments or modifications thereof, one or more of the following applies:

said one or more carriers being configured for automatic terminal measurements are one or more carriers in the carrier aggregation of said terminal, and are configured for simultaneous automatic terminal measurements of at least some of the carriers in the carrier aggregation of said terminal, and the processor, for performing automatic terminal measurements, is configured to simultaneously perform automatic terminal measurements on the configured one or more carriers and, wherein said configured one more carriers include primary and/or secondary carriers of said terminal, said one or more carriers being configured for automatic terminal measurements include a carrier in the carrier aggregation of said terminal, and are configured for priority-based automatic terminal measurements based on a predetermined priority of said carrier, and the processor, for performing automatic terminal measurements, is configured to perform automatic terminal measurements on the configured carrier of said terminal based on the predetermined priority of said configured carrier, wherein said configured carrier includes a primary carrier of said terminal, the processor is configured to perform the automatic terminal measurements with a fixed length of a measurement period or with a length of a measurement period according to the priority of the respective configured carrier such that the length of the measurement period is the higher the higher the priority of the respective configured primary carrier is, the processor, for acquiring, is configured to and/or the apparatus further comprises a receiver configured to receive a predetermined radio resource control attribute and/or message defining the configuration of said one or more carriers for automatic terminal measurements, the automatic terminal measurements comprise automatic data collection and/or logging relating to said one or more carriers, the automatic terminal measurements relate to logged and/or immediate measurements for minimizing drive tests, wherein the processor is configured such that acquiring is accomplished in a connected mode and performing is accomplished in an idle mode for logged measurements for minimizing drive tests and acquiring and performing are accomplished in a connected mode for immediate measurements for minimizing drive tests, and/or the apparatus is operable as or at the terminal, including a user equipment.

According to an exemplary seventh aspect of the present invention, there is provided a computer program product including a program comprising software code portions being arranged, when run on a processor of an apparatus (such as e.g. according to the above fourth aspect and/or developments or modifications thereof), to perform the method according to the above first aspect and/or developments or modifications thereof.

According to an exemplary eighth aspect of the present invention, there is provided a computer program product including a program comprising software code portions being arranged, when run on a processor of an apparatus (such as e.g. according to the above fifth aspect and/or developments or modifications thereof), to perform the method according to the above second aspect and/or developments or modifications thereof.

According to an exemplary ninth aspect of the present invention, there is provided a computer program product including a program comprising software code portions being arranged, when run on a processor of an apparatus (such as e.g. according to the above sixth aspect and/or developments or modifications thereof), to perform the method according to the above third aspect and/or developments or modifications thereof.

According to further developments or modifications thereof, the computer program product according to the seventh, eighth or ninth aspect comprises a computer-readable medium on which the software code portions are stored, and/or the program is directly loadable into a memory of the processor.

By way of exemplary embodiments of the present invention, there are provided mechanisms for terminal measurement configuration in carrier aggregation.

By way of exemplary embodiments of the present invention, there are provided mechanisms enabling a network-controlled configuration of terminal measurements in carrier aggregation, specifically enabling the determination of one or more specific carriers (primary and/or secondary carriers) for which MDT reporting is desired and/or equal measurement results/quantities for different carriers (primary and/or secondary carriers) in MDT reporting.

It is an advantage of exemplary embodiments of the present invention that measurement results for a desired carrier may be reliably obtained in a desired quantity, rather than a somewhat randomly captured measurement result.

BRIEF DESCRIPTION OF THE DRAWINGS

In the following, the present invention will be described in greater detail by way of non-limiting examples with reference to the accompanying drawings, in which.

DETAILED DESCRIPTION OF EMBODIMENTS OF THE PRESENT INVENTION

Figure 1:
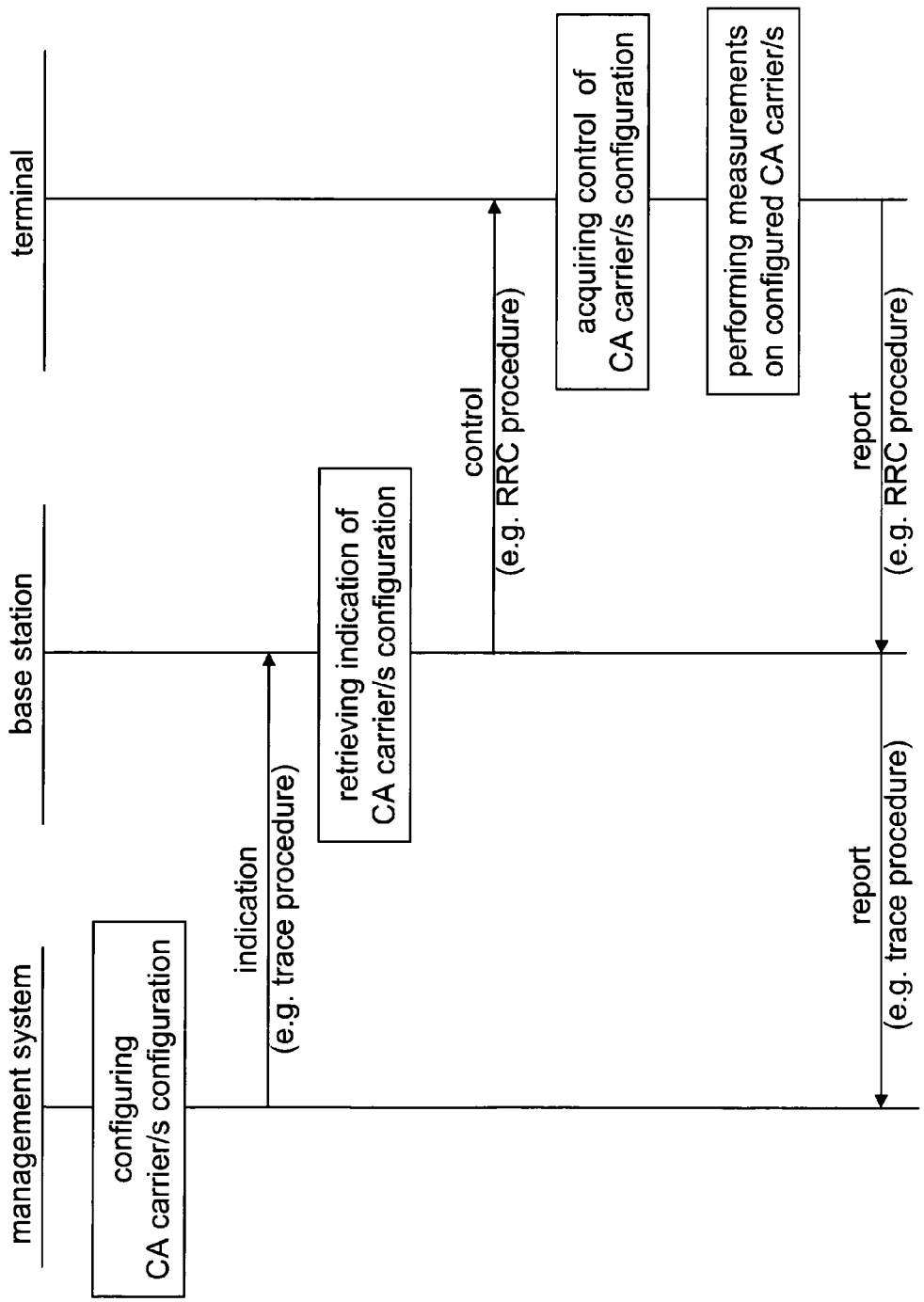
FIG. 1 shows a signaling diagram of an exemplary procedure according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

The present invention and its embodiments are mainly described in relation to 3GPP specifications being used as non-limiting examples for certain exemplary network configurations and deployments. In particular, the MDT context (measurement, logging and reporting) is used as a non-limiting example for the applicability of thus described exemplary embodiments. In this regard, the term "terminal measurements" and the like may exemplarily refer to MDT measurement, logging and reporting. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Generally, embodiments of the present invention may be applicable for/in any kind of modern and future communication network including any conceivable mobile/wireless communication networks according to 3GPP (Third Generation Partnership Project) or IETF (Internet Engineering Task Force) specifications.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to exemplary embodiments of the present invention, there are provided mechanisms, measures and means for terminal measurement configuration in carrier aggregation, thus enabling a network-controlled configuration of terminal measurements in carrier aggregation. Specifically, an improved/enhanced terminal measurement configuration in carrier aggregation may be facilitated in that one or more carriers may be measured simultaneously and/or the measurement of one or more carriers may be made in consideration of a priority thereof. The respective configuration may depend on the terminal's or terminals' capabilities in terms of single- or multi-carrier terminal measurements (particularly in idle mode), which may dynamically vary on the basis of environmental conditions (such as e.g. mode of a terminal) or be specific for each terminal on the basis of its inherent properties (e.g. whether or not a terminal supports multi-carrier terminal measurements).

In the following, exemplary embodiments of the present invention are described with reference to methods, procedures and functions, as well as with reference to structural arrangements and configurations.

FIG. 1 shows a signaling diagram of an exemplary procedure according to exemplary embodiments of the present invention. The exemplary procedure according to FIG. 1 may, for example, be performed by or at a system comprising a management system (such as a network management system, an operation and maintenance (OAM) system, an IRPManager and/or IRPAgent), a base station (such as an eNodeB/eNB, radio network controller (RNC), IRPAgent) and a terminal (such as a user equipment (UE)).

As shown in FIG. 1, the management system according to embodiments of the present invention may be operative for configuring one or more carriers (i.e. a carrier configuration) for automatic terminal measurements relating to network performance on said one or more carriers, said one or more carriers being CA carriers, and indicating the carrier configuration of said one or more carriers for automatic terminal measurements towards the base station. Further, the base station according to embodiments of the present invention may be operative for retrieving an indication of the configuration of said one or more carriers for automatic terminal measurements, and controlling the configuration of said one or more carriers for automatic terminal measurements towards the terminal (or more terminals under its coverage). Further, the terminal according to embodiments of the present invention may be operative for acquiring the control of the configuration of said one or more carriers, and performing automatic terminal measurements on the configured one or more carriers according to the carrier configuration. According to embodiments of the present invention, the management system, the base station and the terminal may further be operative for a corresponding reporting functionality.

According to embodiments of the present invention, the management system may be specifically operative for decide on which carriers are needed/desired to collect measurements and to establish a corresponding carrier configuration. In the priority-based approach, the management system may be further operative for evaluating a related priority of carriers from MDT measurement perspective, i.e. on which carrier more measurement results, are desired, and to establish a corresponding carrier configuration.

According to embodiments of the present invention, the carrier configuration may define, e.g. depending on terminal capabilities (particularly in idle mode), one or more carriers for simultaneous measurement and/or one or more carriers for a priority-based measurement. While the management system does not have knowledge on the usage of CA carriers as primary and/or secondary carriers at certain terminals, such carrier configuration may eventually lead to different measurement scenarios at the terminal side. For example, in the simultaneous measurement approach, a terminal may eventually be controlled to simultaneously measure one or more secondary carriers with or without its primary carrier. In another example, in the priority-based approach, a terminal may eventually be controlled on a priority basis to measure its primary carrier. In this regard, the management system according to embodiments of the present invention may be operative for determining a proper carrier configuration, e.g. depending on terminal capabilities or not. Further, the base station according to embodiments of the present invention may be operative for controlling one or more terminals depending on the (type of) carrier configuration. Still further, the terminal according to embodiments of the present invention may be operative for performing terminal measurements depending on the (type of) control and/or carrier configuration.

The above-mentioned priority-based approach according to embodiments of the present invention enables configuring an order/weight of measuring and logging on the thus configured carriers. As a result, more log samples will be provided by the terminal/s for a carrier with a higher priority. The above-mentioned simultaneous measurement approach according to embodiments of the present invention may for example enable that a primary carrier and at least one secondary carrier are always measured at the same time. As a result, the same number of log samples will be provided by the terminal/s for each carrier to be measured, i.e. log for each configured carrier is included in each measurement report of the terminal/s. According to embodiments of the present invention, the indication from the management system to the base station may be based on a trace procedure. In this regard, the carrier configuration (e.g. the secondary carrier/s and/or the primary carrier/s with priority information or at least the priority information as such) may be indicated in a predetermined trace attribute and/or message.

According to embodiments of the present invention, the control from the base station to the terminal may be based on a RRC (radio resource control) procedure. In this regard, the carrier configuration (e.g. the secondary carrier/s and/or the primary carrier/s with priority information) may be controlled in a predetermined RRC attribute and/or message. The base station may be operative for mapping a received trace attribute and/or message into a RRC attribute and/or message for forwarding. In case of Immediate MDT reporting, the control may for example be accomplished by way a RRCConnectionReconfiguration message. In case of Logged MDT reporting, the control may for example be accomplished by way a LoggedMeasurementsConfiguration message According to embodiments of the present invention, depending on whether Immediate MDT reporting or Logged MDT reporting is applicable, the measurements are performed in the respective terminal's connected or idle mode. In the latter case, the configuration is to be indicated and controlled to the terminal before going to idle.

According to embodiments of the present invention, the management system and trace-based indications may be realized along the following lines.

The management system may be a typical management system comprising two parts, i.e. an element management system (such as e.g. an IRPAgent) and a network management system (such as e.g. an IRPManager). The interface in between may be the 3GPP-defined standard Itf-N or northbound interface.

The trace procedures for configuration indication may be used on Itf-N interface in that ActivateTraceJob operation is extended with parameters for MDT configuration. In this case, if a terminal needs to be directed to another carrier, then the ActivateTraceJob operation may convey that information. Once this is sent to the IRPAgent side, the IRPAgent may reside in the base station (e.g. eNB/RNC), but it may also reside on the core network side. In the latter case, the parameters are conveyed from HSS (home subscriber system) to MME/SGSN (mobility management entity/serving GPRS support node) and then to the base station (e.g. eNB/RNC). To this end, according to embodiments of the present invention, trace activation signals on the different interfaces are modified accordingly. The thus modified trace activation signals may be based on, e.g., MAPActivateTraceJob in the MAP interface, or a Trace Data AVP (attribute value pair) in the Diameter specification, which AVP may be added to the InsertSubscriberData request, or the like. Then, the MME/SGSN may forward the parameters to the base station (e.g. eNB/RNC) via the S1/Iu interface. In view of the above, specified trace procedures may be utilized for configuration indication according to embodiments of the present invention in that an additional attribute is introduced in the above-outlined operations.

Figure 2:
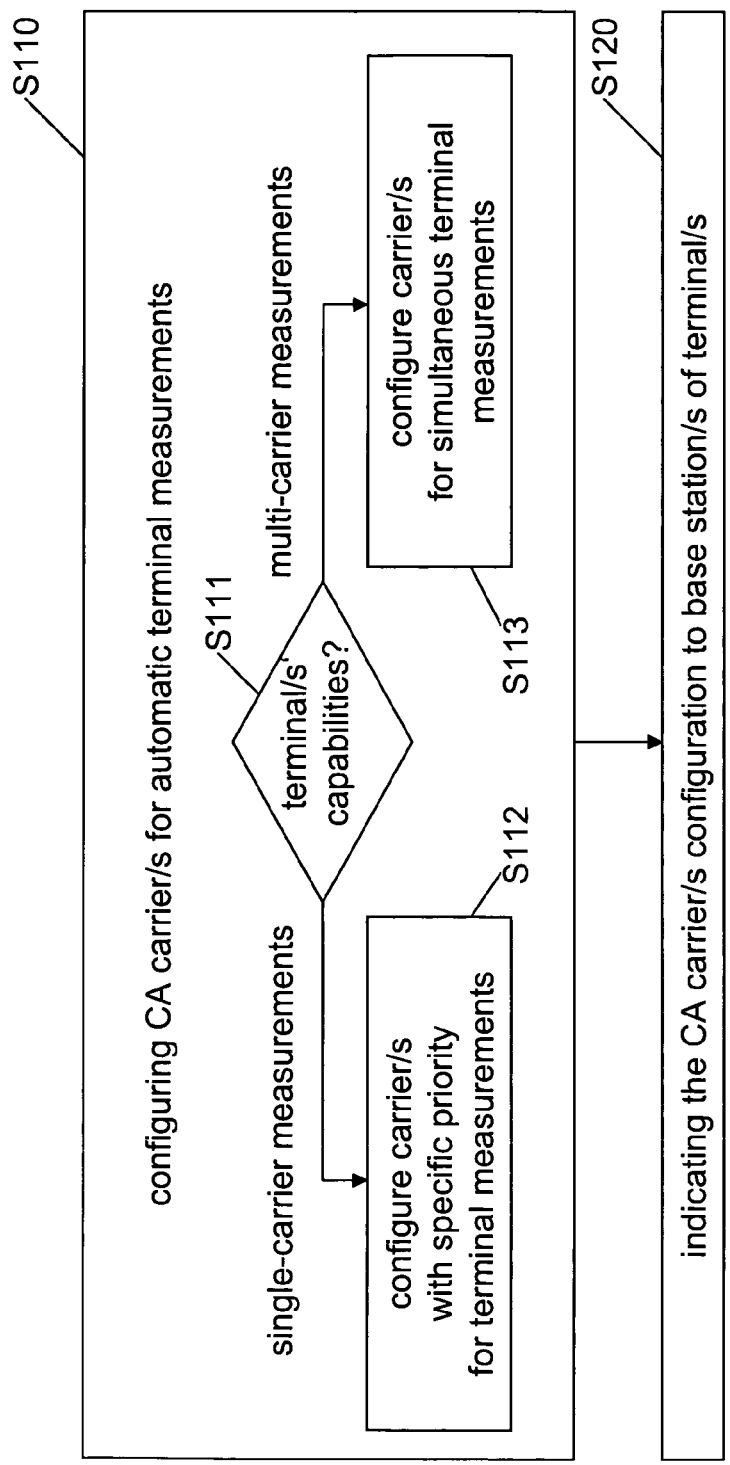
FIG. 2 shows a flowchart of an exemplary method according to exemplary embodiments of the present invention.

FIG. 2 shows a flowchart of an exemplary method according to exemplary embodiments of the present invention.

The exemplary method according to FIG. 2 may, for example, be performed by or at a management system according to FIG. 1.

As shown in FIG. 2, configuring a CA carrier configuration (step S110) may comprise a discrimination (such as a determination step) (step S111). The discrimination may be based on an evaluation on whether a terminal allows a simultaneous measurement of carriers, or not (e.g. when the terminal is required to follow mandated serving cell measurements in view of general rules). Depending on terminal capabilities or other criteria, either a single-carrier measurement configuration including carrier/s with priority may be configured (step S112) or a multi-carrier measurement configuration including multiple carriers may be configured (step S113). Further, the thus configured carrier configuration may be indicated to the base station (step 120).

In the case of a single-carrier measurement configuration, the carriers to be measured are configured (and then indicated) with a priority which may be preconfigured or decided by the management system on the basis of any conceivable parameter (e.g. available measurement quantities, age of previous measurement, importance of carrier, etc.). For example, a carrier CC1 may be assigned the highest priority, a carrier CC3 may be assigned the second priority, a carrier CC2 may be assigned the third priority, and so on. The higher the priority, the more measurements (and measurement logs) on the respective carrier are needed/desired.

While FIG. 2 depicts both variants of single- and multi-carrier measurement configurations, a method according to embodiments of the present invention may comprise only one of these two types of configurations, e.g. if the other type is not feasible or supported for some reason (and, accordingly, no discrimination).

Figure 3:
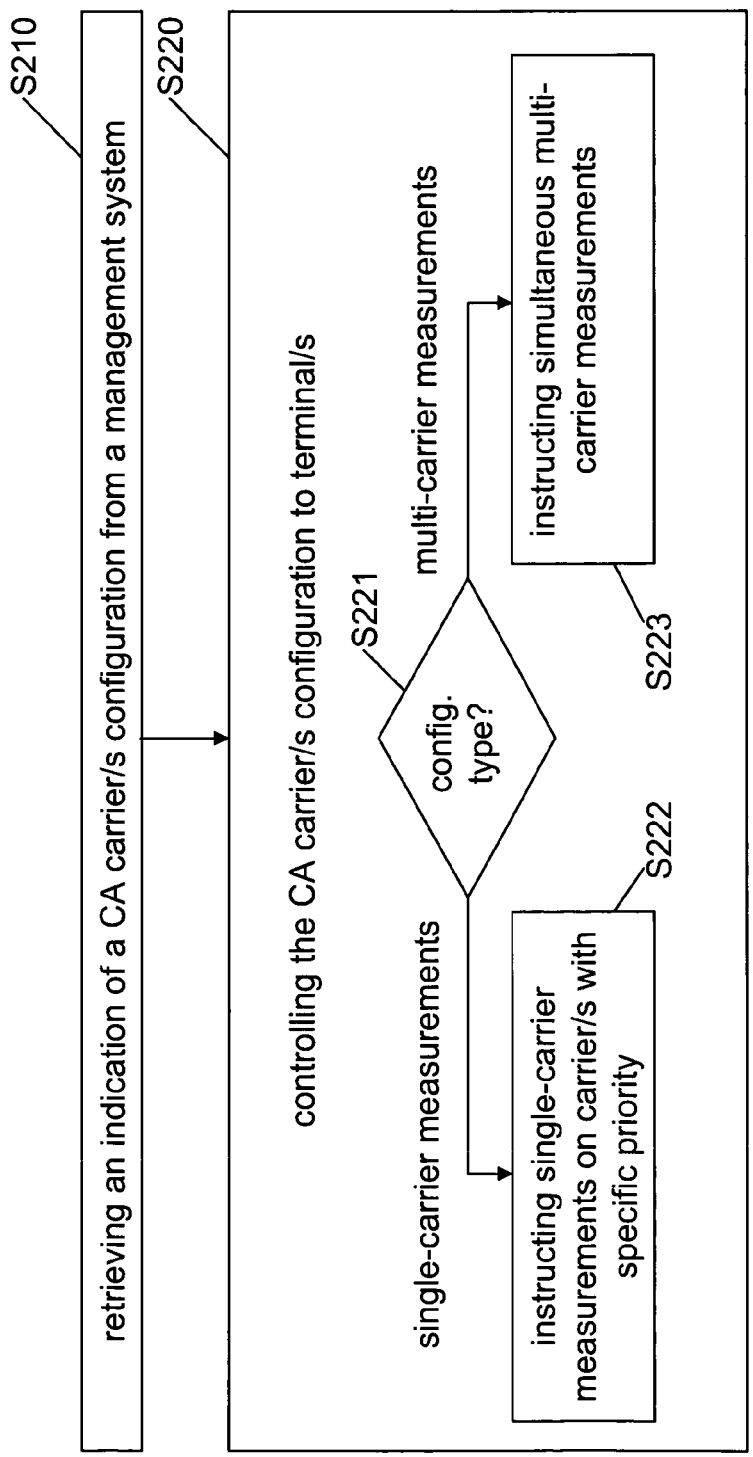
FIG. 3 shows a flowchart of another exemplary method according to exemplary embodiments of the present invention.

FIG. 3 shows a flowchart of another exemplary method according to exemplary embodiments of the present invention. The exemplary method according to FIG. 3 may, for example, be performed by or at a base station according to FIG. 1.

As shown in FIG. 3, an indication of a carrier configuration may be retrieved (e.g. received) from the management system (step 210). Further, the thus retrieved carrier configuration may be controlled to one or more terminals (steps S220). Controlling the CA carrier configuration may comprise a discrimination (such as a determination step) (step S221).

Depending on the configuration type (based on terminal capabilities or other criteria), either a single-carrier measurement configuration including carrier/s with priority may be instructed (step S222) or a multi-carrier measurement configuration including multiple carriers may be instructed (step S223).

In the case of a single-carrier measurement instruction, the carriers to be measured are instructed with a priority according to the carrier configuration. According to embodiments of the present invention, the priority of a carrier to be measured may be considered by way of a number of terminals to be instructed for measuring this carrier and/or a length of a measurement period for measuring this carrier at a terminal. In the former case, the base station may select the terminals such that, in the above-mentioned example, the base station may (try to) select more terminals with CC1 as the primary carrier to do MDT reporting, fewer terminals with CC3 as the primary carrier to do MDT reporting, and so on. Furthermore, the base station may redirect one or more terminals (e.g. by using a redirection mechanism of RRCConnectionRelease message) to camp on a different carrier (e.g. with a higher priority) so that more terminals will camp on carriers to be measured with higher priority. Such redirection may be effective when there are not enough terminals with primary carriers of high measurement priority so that the priority-based measurement may be realized. In the latter case, which may be preferable when there are not many available terminals supporting MDT reporting in a CA scenario, the impact on the selected terminals may be reduced, the base station may adjust a length of a measurement (logging) period such that, in the above-mentioned example, the instructed terminal uses a longer measurement period for CC1, a shorter measurement period for CC3, and so on. Thereby, carriers with lower priorities can be logged more rarely than carriers with higher priorities. In this case, the indication from the management system may comprise the applicable measurement (logging) period/duration for each carrier as priority information, e.g. in the respective trace attribute and/or message.

While FIG. 3 depicts both variants of single- and multi-carrier measurement instructions, a method according to embodiments of the present invention may comprise only one of these two types of instructions, e.g. if the other type is not feasible or supported for some reason (and, accordingly, no discrimination).

Figure 4:
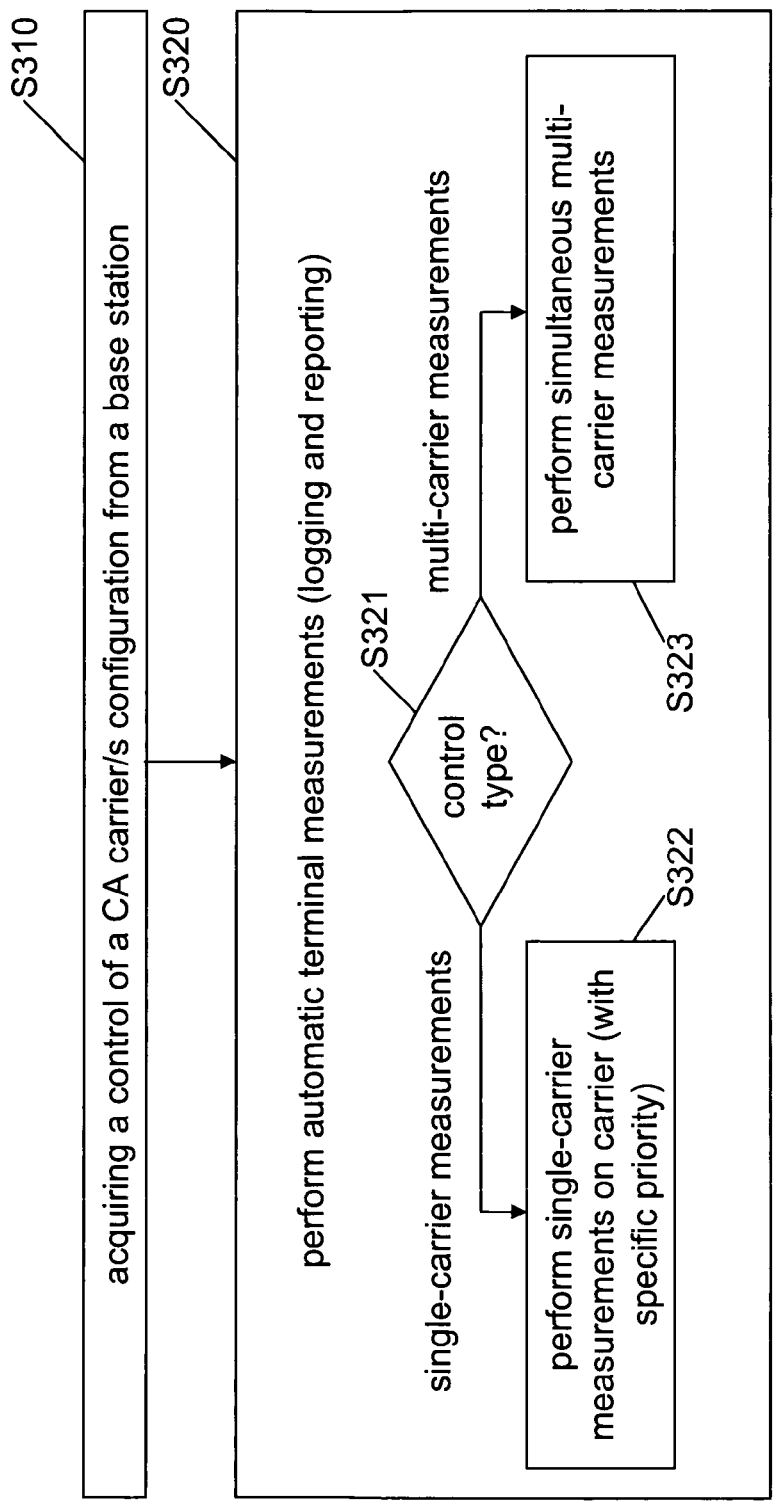
FIG. 4 shows a flowchart of still another exemplary method according to exemplary embodiments of the present invention.

FIG. 4 shows a flowchart of still another exemplary method according to exemplary embodiments of the present invention. The exemplary method according to FIG. 4 may, for example, be performed by or at a terminal according to FIG. 1.

As shown in FIG. 4, a control of a carrier configuration may be acquired (e.g. received) from the base station (step 310). Further, terminal measurements (potentially also including logging and/or reporting) may be performed on the basis of the thus acquired carrier configuration may (steps S320). Performing the CA carrier measurements may comprise a discrimination (such as a determination step) (step S321). Depending on the control type (based on terminal capabilities or other criteria), either a single-carrier measurement including carrier/s with priority may be performed (step S322) or a multi-carrier measurement including multiple carriers may be performed (step S323).

While FIG. 4 depicts both variants of single- and multi-carrier measurements, a method according to embodiments of the present invention may comprise only one of these two types of measurements, e.g. if the other type is not feasible or supported for some reason (and, accordingly, no discrimination).

The above-described procedures and functions may be implemented by respective functional elements, processors, or the like as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 5, while for the sake of brevity reference is made to the detailed description of respective corresponding methods and operations according to FIGS. 1 to 4 above.

Figure 5:
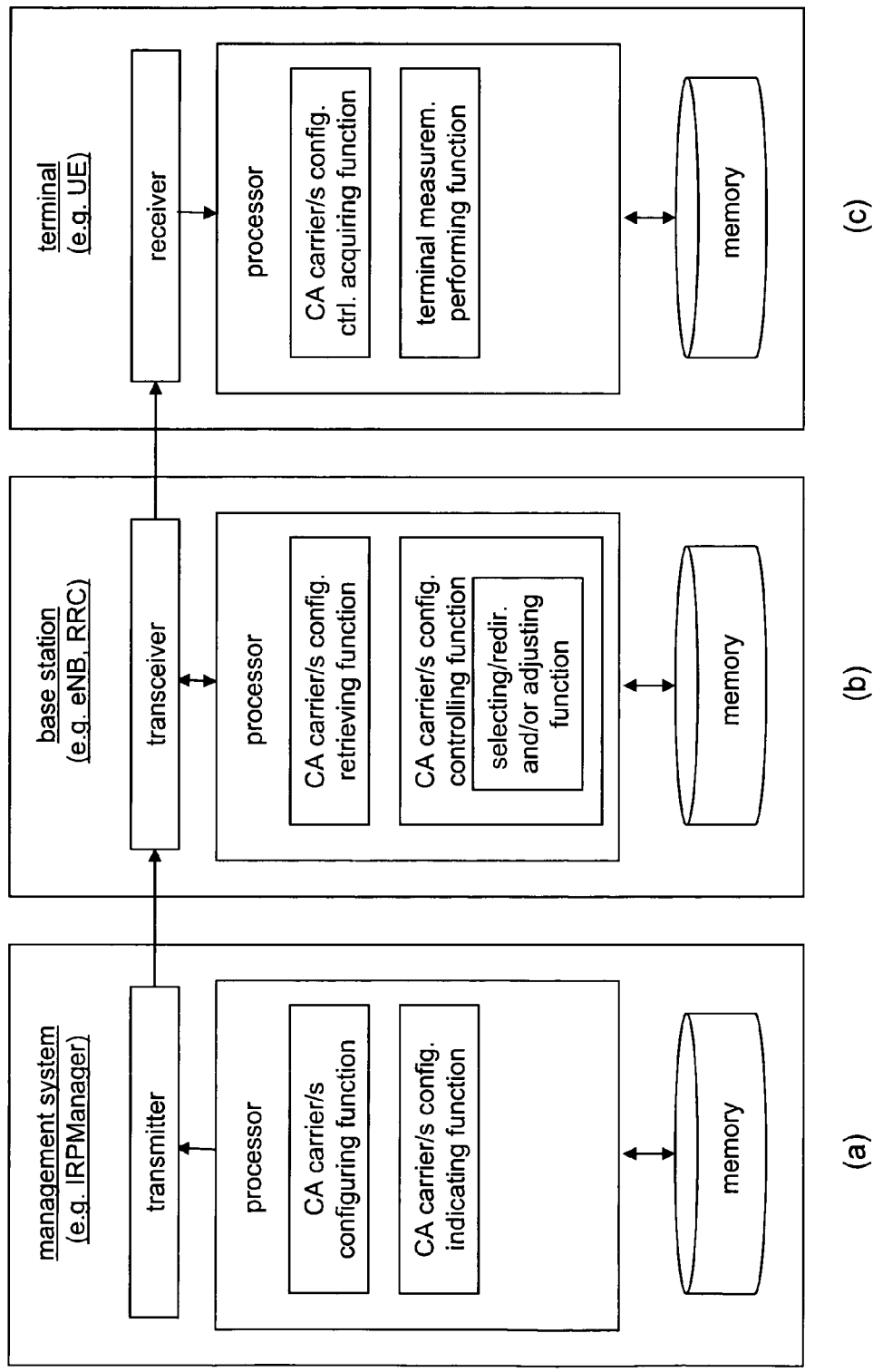
FIG. 5 shows a schematic block diagram of exemplary devices according to exemplary embodiments of the present invention.

In FIG. 5, the solid line blocks are basically configured to perform respective operations as described above. The entirety of solid line blocks are basically configured to perform the methods and operations as described above, respectively. With respect to FIG. 5, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 5, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 5 shows a schematic block diagram of exemplary devices according to exemplary embodiments of the present invention. Any one of the thus depicted devices may be an apparatus according exemplary embodiments of the present invention, and any combination of the thus depicted devices (e.g. a combination of source base station and target base station, with or without an arbitrary number of intermediate devices) may be a system according exemplary embodiments of the present invention.

In view of the above, the thus described apparatus on the left side may represent a (part of a) apparatus such as a management system as described above, the thus described apparatus in the middle may represent a (part of a) base station as described above, and the thus described apparatus on the right side may represent a (part of a) apparatus such as a terminal as described above.

According to FIG. 5(a), the apparatus on the left side is an apparatus according to exemplary embodiments of the present invention. This apparatus is configured to perform a procedure as described in conjunction with FIG. 2. Therefore, while basic functionalities are described hereinafter, reference is made to the above description of FIG. 2 for details thereof.

As shown in FIG. 5(a), this apparatus according to exemplary embodiments of the present invention comprises a processor and a transmitter as well as, optionally, a memory. Specifically, the processor may be configured to configure one or more (CA) carriers for automatic terminal measurements relating to network performance on said one or more carriers, thus representing means for configuring a carrier configuration. Further, the processor may be configured to indicate the configuration of said one or more carriers towards a base station, thus representing means for indicating a carrier configuration. In other words, the processor may have a corresponding CA carrier/s configuring function and a corresponding CA carrier/s configuration indicating function.

According to FIG. 5(b), the apparatus in the middle is an apparatus according to exemplary embodiments of the present invention. This apparatus is configured to perform a procedure as described in conjunction with FIG. 3. Therefore, while basic functionalities are described hereinafter, reference is made to the above description of FIG. 3 for details thereof.

As shown in FIG. 5(b), this apparatus according to exemplary embodiments of the present invention comprises a processor and a transceiver as well as, optionally, a memory. Specifically, the processor may be configured to retrieve an indication of a configuration of one or more carriers for automatic terminal measurements relating to network performance on said one or more carriers, thus representing means for retrieving an indication of a carrier configuration. Further, the processor may be configured to control the configuration of said one or more carriers for automatic terminal measurements, thus representing means for controlling a carrier configuration for terminal measurements. In other words, the processor may have a corresponding CA carrier/s configuration retrieving and a corresponding CA carrier/s configuration controlling function. Further, for controlling, the processor may be configured to select terminals based on the priority of a carrier to be measured, thus representing means for selecting terminals on the basis of a priority; the processor may be configured to redirect terminals to camp on a primary carrier having a higher priority than their previous primary carrier, thus representing means for redirecting terminals on the basis of a priority; the processor may be configured to adjust a period for automatic terminal measurements at terminals for each configured carrier based on the priority of a carrier to be measured, thus representing means for adjusting a measurement period on the basis of a priority. In other words, the CA carrier/s configuration controlling function may include at least one of a selecting function, a redirecting function and an adjusting function.

According to FIG. 5(c), the apparatus on the right side is an apparatus according to exemplary embodiments of the present invention. This apparatus is configured to perform a procedure as described in conjunction with FIG. 4. Therefore, while basic functionalities are described hereinafter, reference is made to the above description of FIG. 4 for details thereof.

As shown in FIG. 5(c), this apparatus according to exemplary embodiments of the present invention comprises a processor and a receiver as well as, optionally, a memory. Specifically, the processor may be configured to acquire a control of a configuration of one or more carriers for automatic terminal measurements relating to network performance on said one or more carriers, thus representing means for acquiring a control of a carrier configuration. Further, the processor may be configured to perform automatic terminal measurements on the configured one or more carriers according to the configuration of said one or more carriers, thus representing means for performing terminal measurements. In other words, the processor may have a corresponding CA carrier/s control acquiring retrieving and a terminal measurements performing function.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

Generally, for the purpose of the present invention as described herein above, it should be noted that method steps and functions likely to be implemented as software code portions and being run using a processor at one of the entities, a network element, or a terminal (as examples of devices, apparatuses and/or modules thereof, or as examples of entities including apparatuses and/or modules therefor), are software code independent and can be specified using any known or future developed programming language, such as e.g. Java, C++, C, and Assembler, as long as the functionality defined by the method steps is preserved;

generally, any method step is suitable to be implemented as software or by hardware without changing the idea of the invention in terms of the functionality implemented;

method steps, functions, and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

There are provided measures for terminal measurement configuration in carrier aggregation, said measures exemplarily comprising a configuration of one or more carriers for automatic terminal measurements relating to network performance on said one or more carriers, said one or more carriers being carriers in a carrier aggregation for one or more terminals, wherein said configuration may be dependent on the one or more terminals' capabilities in terms of single- or multi-carrier terminal measurements. According to such configuration, automatic terminal measurements may be performed simultaneously on the configured one or more carriers or on the configured one or more carriers based on a predetermined priority of each carrier. Said measures may exemplarily be applied for in an MDT context.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

The invention claimed is:

1. A method comprising
configuring, by a network device, a carrier measurement configuration of plural carriers for automatic terminal measurements; and
indicating the carrier measurement configuration of said plural carriers for automatic terminal measurements towards a base station of one or more terminals,
wherein the automatic terminal measurements relate to logged measurements of said plural carriers for minimizing drive tests, and
wherein, in the carrier measurement configuration, said plural carriers are configured for automatic terminal measurements of a predefined at least one of frequencies, and identifications of one or more carriers of said plural carriers.

2. The method according to claim 1, wherein the identifications of the one or more carriers comprises a predetermined priority of each of the one or more carriers for performing the automatic terminal measurements.

3. The method according to claim 1, wherein
the indicating comprises at least one of:
instructing automatic terminal measurements with the carrier measurement configuration of said one or more carriers by way of a trace operation, and
activating a trace job for automatic terminal measurements with the carrier measurement configuration of said one or more carriers, and
transmitting a predetermined trace attribute defining the carrier measurement configuration of said one or more carriers for said automatic terminal measurements.

4. The method according to claim 1, wherein
the automatic terminal measurements comprise automatic data collection and logging relating to said one or more carriers, and
wherein the network device comprises a network management entity and/or system or an operation and maintenance entity or system of the network, including at least one of an IRPManager and an IRPAgent.

5. A computer program product including a device comprising software code portions being arranged, when run on a processor of an apparatus, to cause the apparatus to perform the method according to claim 1.

6. The method according to claim 1, wherein, in the carrier measurement configuration, said plural carriers are configured for simultaneous automatic terminal measurements of said predefined frequencies.

7. A method comprising
retrieving an indication of a carrier measurement configuration of plural carriers for automatic terminal measurements; and
controlling the carrier measurement configuration of said plural carriers for automatic terminal measurements towards one or more terminals, said controlling comprising instructing the one or more terminals to perform automatic terminal measurements on the plural carriers according to the retrieved carrier measurement configuration,
wherein the automatic terminal measurements relate to logged measurements of said plural carriers for minimizing drive tests, and
wherein, in the carrier measurement configuration, said plural carriers are configured for automatic terminal measurements of a predefined at least one of frequencies, and identifications of one or more carriers of said plural carriers.

8. The method according to claim 7, wherein the identifications of the one or more carriers comprises a predetermined priority of each of the one or more carriers for performing the automatic terminal measurements.

9. The method according to claim 7, wherein the instructing comprises
selecting respective terminals of the one or more terminals to be instructed to perform the automatic terminal measurements for a respective configured carrier, wherein the selecting is based on the respective terminals having the respective configured carrier as a primary carrier, and the respective configured carrier having a higher priority indicated in the carrier measurement configuration; and
adjusting a period for automatic terminal measurements at the one or more terminals to be instructed for the respective configured carrier, which carrier is the primary carrier of a respective terminal, based on the higher priority of said carrier such that a length of a measurement period is longer than a lower priority configured carrier.

10. The method according to claim 9, wherein
the selecting comprises redirecting one or more terminals to camp on the primary carrier having the higher priority, wherein the priority is higher in the carrier measurement configuration than a priority of their previous primary carrier.

11. The method according to claim 7, wherein
the retrieving comprises at least one of:
receiving an instruction of said automatic terminal measurements with the carrier measurement configuration of said one or more carriers by way of a trace operation,
receiving an activation of a trace and/or a trace job for automatic terminal measurements with the carrier measurement configuration of said one or more carriers,
receiving a predetermined trace attribute defining the carrier measurement configuration of said one or more carriers for automatic terminal measurements, and the method further comprises:
mapping the received predetermined trace attribute into at least one of a predetermined radio resource control attribute and message,
wherein the controlling comprises transmitting a predetermined radio resource control attribute and/or message defining the carrier measurement configuration of said one or more carriers for said automatic terminal measurements.

12. The method according to claim 7, wherein
the automatic terminal measurements comprise automatic data collection relating to said one or more carriers,
wherein the controlling is accomplished in a connected mode of said one or more terminals and relates to automatic terminal measurements in idle mode of said one or more terminals for logged measurements for minimizing drive tests and/or connected mode of said one or more terminals for immediate measurements for said minimizing drive tests, and
wherein the method is operable at or by a base station of said one or more terminals, including an eNodeB, a radio network controller and an IRPAgent.

13. A computer program product including a device comprising software code portions being arranged, when run on a processor of an apparatus, to cause the apparatus to perform the method according to claim 7.

14. A method comprising
acquiring, by a terminal, a control of a carrier measurement configuration of plural carriers for automatic terminal measurements relating to network performance on said plural carriers, said plural carriers being carriers in a carrier aggregation for the terminal, said control comprising an instruction to perform automatic terminal measurements on the plural carriers according to the carrier measurement configuration; and
performing automatic terminal measurements on one or more carriers of the configured plural carriers according to the configuration of said plural carriers,
wherein the automatic terminal measurements relate to logged measurements of said plural carriers for minimizing drive tests, and
wherein, in the carrier measurement configuration, said plural carriers are configured for automatic terminal measurements of a predefined at least one of frequencies, and identifications of the one or more carriers of said plural carriers.

15. The method according to claim 14 wherein the automatic terminal measurements are performed on a respective configured carrier of said one or more carriers with a length of a measurement period according to a priority of the respective configured carrier, such that the length of the measurement period of the respective configured carrier is longer based on an identification in the carrier measurement configuration of a higher priority of the respective configured carrier.

16. The method according to claim 14, wherein
the automatic terminal measurements comprise at least one of:
automatic data collection and logging relating to said one or more carriers,
wherein the acquiring is accomplished in a connected mode and the performing is accomplished in an idle mode,
and wherein the terminal comprises a user equipment.

17. A computer program product including a device comprising software code portions being arranged, when run on a processor of an apparatus, to cause the apparatus to perform the method according to claim 14.

18. An apparatus comprising
a memory including computer program code; and
a processor,
the memory and the computer program code configured, with the processor, to cause the apparatus to perform at least the following:
retrieve an indication of a carrier measurement configuration of plural carriers for automatic terminal measurements; and
control the carrier measurement configuration of said plural carriers for automatic terminal measurements towards one or more terminals, said controlling comprising instructing the one or more terminals to perform automatic terminal measurements on one or more carriers of the plural carriers according to the retrieved carrier measurement configuration,
wherein the automatic terminal measurements relate to logged measurements of said plural carriers for minimizing drive tests, and
wherein, in the carrier measurement configuration, said plural carriers are configured for automatic terminal measurements of a predefined at least one of frequencies and identifications of the one or more carriers of said plural carriers.

19. The apparatus according to claim 18, wherein the identifications of the one or more carriers comprises a predetermined priority of each of the one or more carriers for performing the automatic terminal measurements.

20. The apparatus according to claim 18, wherein
said one or more carriers being configured for automatic terminal measurements are carriers in the carrier aggregation, and are configured for priority-based automatic terminal measurements of any one of the carriers in the carrier aggregation based on a predetermined priority of any one of said carriers, and
the processor, for controlling, is configured to instruct the one or more terminals to perform automatic terminal measurements on the configured carriers based on the predetermined priority of each configured carrier, wherein each configured and instructed carrier includes a primary carrier of a respective terminal.

21. The apparatus according to claim 20, wherein the processor is configured to cause the apparatus to:
select respective terminals of the one or more terminals to be instructed to perform the automatic terminal measurements for a respective configured carrier, wherein the selecting is based on the respective terminals having the respective configured carrier as a primary carrier and the respective configured carrier having a higher priority indicated in the carrier measurement configuration; and
adjust a period for automatic terminal measurements at the one or more terminals to be instructed for the respective configured carrier, which carrier is the primary carrier of a respective terminal, based on the higher priority of said respective carrier such that a length of a measurement period is longer than a lower priority configured carrier.

22. The apparatus according to claim 18, wherein the processor is configured to cause the apparatus to at least one of:

receive an instruction of automatic terminal measurements with the carrier measurement configuration of said one or more carriers by way of a trace operation, receive an activation of a trace job for automatic terminal measurements with the configuration of said one or more carriers, and receive a predetermined trace attribute defining the configuration of said one or more carriers for automatic terminal measurements, wherein the processor is further configured to cause the apparatus to at least one of map the received predetermined trace attribute into at least one of a predetermined radio resource control attribute and message, and wherein the processor is configured to cause the apparatus to transmit at least one of a predetermined radio resource control attribute and message defining the configuration of said one or more carriers for automatic terminal measurements.

23. The apparatus according to claim 18, wherein the automatic terminal measurements comprise automatic data collection and logging relating to said one or more carriers, wherein the controlling is accomplished in a connected mode of said one or more terminals and relates to automatic terminal measurements in at least one of an idle mode of said one or more terminals for logged measurements for minimizing drive tests and a connected mode of said one or more terminals for immediate measurements for minimizing drive tests, and wherein the apparatus is operable as or at a base station of said one or more terminals, including an eNodeB, a radio network controller and an IRPAgent.

* * * * *